Aug. 20, 1963 L. KATZ 3,101,114

HEAT SINK

Filed Feb. 1, 1961

INVENTOR.

Leonhard Katz

BY

Roberts, Cushman & Grover

ATT'YS

United States Patent Office 3,101,114
Patented Aug. 20, 1963

3,101,114
HEAT SINK

Leonhard Katz, Woburn, Mass., assignor to Astro Dynamics, Inc., Cambridge, Mass., a corporation of Massachusetts Filed Feb. 1, 1961, Ser. No. 86,533
2 Claims. (Cl. 165—67)

This invention relates to cooling apparatus and more particularly to a means for drawing off heat from relatively small electrical components.

Some concern has previously been given to providing heat sinks or radiators for transistors having relatively high power capabilities but there are some situations, such as when extreme miniaturization of electronic equipment is attempted, in which the heat produced by even relatively small transistors may cause destructively high temperatures.

Small transistors are typically intended or designed to be mounted by their own wire leads, either by soldering directly into the respective circuit or by insertion into a wire gripping socket designed for the purpose. When so mounted, however, heat is removed from the transistor only by air convection, which may be rather restricted, and by radiation from the relatively small surface of the transistor's case.

It is thus the prime object of the present invention to provide an efficient means for removing heat from relatively small transistors whereby destructively high temperatures may be avoided.

Further objects are to provide such a means which is compact, which permits convenient access to the transistor being cooled, which includes a secure means for securely mounting a transistor, which may itself be easily and securely mounted, and which is of simple and inexpensive construction.

The present invention accordingly contemplates utilizing the greater radiating surface of the chassis of the electronic apparatus with which the transistor is typically associated and to this end provides a heat sink for conductively joining the chassis and the case of the transistor. The heat sink comprises a body part and means for mounting the sink to a chassis. The body part includes a cylindrical internal surface for engaging the case of a transistor and a large flat external surface for abutting the chassis.

In a preferred embodiment the body part is split at one side so as to resiliently grasp the transistor and the flat external surface is transverse the axis of the cylindrical surface.

For purposes of illustration a preferred embodiment of the present invention is shown in accompanying drawings in which FIG. 1 is a plan view of a heat sink;

Figure 1:
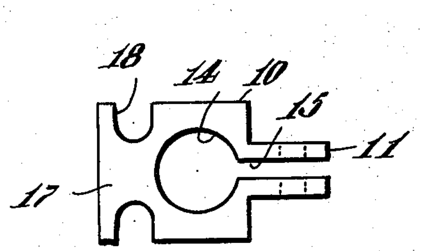
Figure 2:
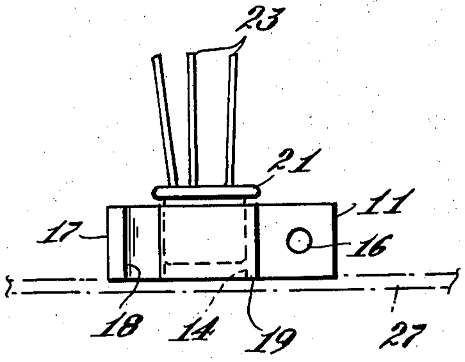
FIG. 2 is a side view of the heat sink.

Referring now to the drawings, the heat sink shown comprises a body part 10 having a cylindrical inner surface 14. The body part is split as at 15 so as to form a clamp and from each side of the split projects an apertured ear 11. The sink is of relatively heavy construction and includes a flat external surface 19 of large area which is transverse the axis of the cylindrical surface 14. On the side of the body 10 opposite the ears 11, there is an extension 17 having two notches 18 which extend parallel the cylindrical surface 14.

In use, the case of a transistor 21 is placed within the cylindrical surface 14 with its leads 23 extending upwardly and is clamped there by tightening a bolt (not shown) passing through the apertures 16 in the ears 11. The sink may then be mounted with the extensive flat surface 19 abutting a chassis panel 27 by bolts (not shown) fitting in the notches 18. The flat surface 19 assures a large contact area of relatively low thermal resistance so that the temperature of the transistor case will never greatly exceed that of the chassis.

Figure 3:
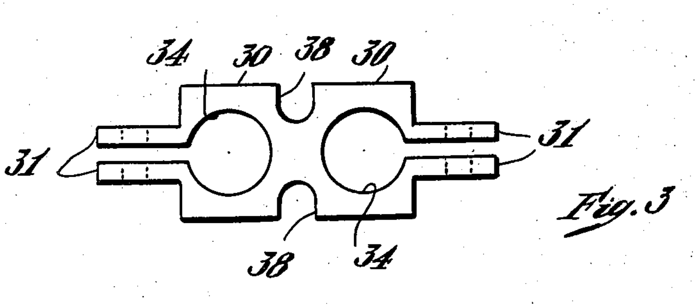
FIG. 3 is a plan view of a modification.

FIG. 3 illustrates a modification useful in drawing heat away from a pair of similar transistors. The sink comprises a pair of body parts 30 arranged with the axes of their cylindrical surfaces 34 parallel and having a pair of mounting notches 38 in common. The apertured ears 31 are arranged as in the example of FIG. 1.

It should be understood that the present disclosure is for the purpose of illustration only and that the present invenion includes all modifications and equivalents falling within the scope of the appended claims.

I claim:

1. For dissipating heat from a transistor or the like, a heat sink comprising a one-piece block of substantially uniform thickness having a flat horizontal plate bottom to seat on a heat dissipator for transferring heat thereto and having a cylindrical opening extending vertically therethrough from top to bottom to receive a transistor therein, said block being split vertically along one entire side of said vertical opening to form two arms each extending about half way around the opening, said arms being spaced apart at said one side and having ears integral therewith, said block having on the other side of said opening an extension away from said arms, said extension having a mounting device to attach said block to said dissipator so that said arms are free throughout substantially their entire length to be sprung apart to permit insertion and removal of the transistor with respect to said opening while the block is mounted on said dissipator.

2. The heat sink of claim 1, said ears being apertured to receive a bolt for drawing said arms toward each other to clamp said transistor in said opening, and said mounting device including vertical openings in said extension.

References Cited in the file of this patent

UNITED STATES PATENTS

| | | |
|---|---|---|
| 1,758,775 | Abbott | May 13, 1930 |
| 1,782,260 | Franquet et al. | Nov. 18, 1930 |
| 2,917,286 | Deakin | Dec. 15, 1959 |
| 2,933,292 | Chislow | Apr. 19, 1960 |